US012694685B2

(12) United States Patent
Schenk et al.

(10) Patent No.: US 12,694,685 B2
(45) Date of Patent: Jul. 28, 2026

(54) ACTIVE LEARNING FOR OBJECT CLASSIFICATION IN VISUAL PERCEPTION TASKS IN A VEHICLE

(71) Applicant: Bayerische Motoren Werke Aktiengesellschaft, Munich (DE)

(72) Inventors: Leonard Schenk, Munich (DE); Sebastian Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/966,662

(22) Filed: Dec. 3, 2024

(65) Prior Publication Data

US 2025/0182492 A1 Jun. 5, 2025

(30) Foreign Application Priority Data

Dec. 4, 2023 (DE) ..................... 10 2023 133 826.9

(51) Int. Cl.
*G06V 20/56* (2022.01)
*G06V 10/74* (2022.01)
(Continued)

(52) U.S. Cl.
CPC ............ *G06V 20/56* (2022.01); *G06V 10/761* (2022.01); *G06V 10/764* (2022.01); *G06V 10/82* (2022.01)

(58) Field of Classification Search
CPC ........ G06F 18/15; G06F 18/22; G06F 18/213; G06F 18/217; G06F 18/2431; G06N 3/048; G06N 3/091; G06N 3/0455; G06V 10/82; G06V 10/761; G06V 10/764; G06V 10/778; G06V 20/56
See application file for complete search history.

(56) References Cited

U.S. PATENT DOCUMENTS

2016/0092790 A1* 3/2016 Ribeiro Mendes Júnior ...............
G06N 20/00
706/12
2021/0142068 A1* 5/2021 Aliamiri .............. G06V 10/774
(Continued)

OTHER PUBLICATIONS

German-language Search Report issued in German Application No. 10 2023 133 826.9 dated Nov. 12, 2024 with partial English translation (12 pages).
(Continued)

*Primary Examiner* — Peet Dhillon
(74) *Attorney, Agent, or Firm* — Crowell & Moring LLP

(57) ABSTRACT

A machine learning algorithm trained to classify objects in automotive sensor data is provided with automotive sensor data as an input. Based on this input, the machine learning algorithm determines an object class. Then, a latent space vector corresponding to activation values within a latent space of the machine learning algorithm is obtained and at least one latent space vector variance is calculated. If the at least one latent space vector variance exceeds a variance threshold, a latent space vector distance quotient is determined, which is indicative of a distance of the latent space vector to a closest object class latent space vector of the same object class relative to a distance of the latent space vector to a closest latent space vector of a different object class. Finally, the automotive sensor data is provided to an object classifier based on the latent space vector distance quotient.

18 Claims, 3 Drawing Sheets

(51) Int. Cl.
  *G06V 10/764*          (2022.01)
  *G06V 10/82*          (2022.01)

(56)                    References Cited

U.S. PATENT DOCUMENTS

| | | | |
|---|---|---|---|
| 2022/0101121 A1* | 3/2022 | Vahdat | G06N 3/0455 |
| 2022/0214693 A1* | 7/2022 | Narang | G05D 1/648 |
| 2024/0054394 A1* | 2/2024 | Hussain | G06N 7/01 |
| 2024/0371048 A1* | 11/2024 | Ravi | G06N 3/045 |

OTHER PUBLICATIONS

Schmidt S. et al, "A Unified Approach Towards Active Learning and Out-of-Distribution Detection", May 25, 2024, pp. 1-23, (23 gages).
Philipsen M. P. et al., "Distance in Latent Space as Novelty Measure", Mar. 31, 2020, (3 pages).
Takezoe R., "Deep Active Learning for Computer Vision: Past and Future", APSIPA Transactions on Signal and Information Processing, 2023, pp. 1-38, (38 pages).

* cited by examiner

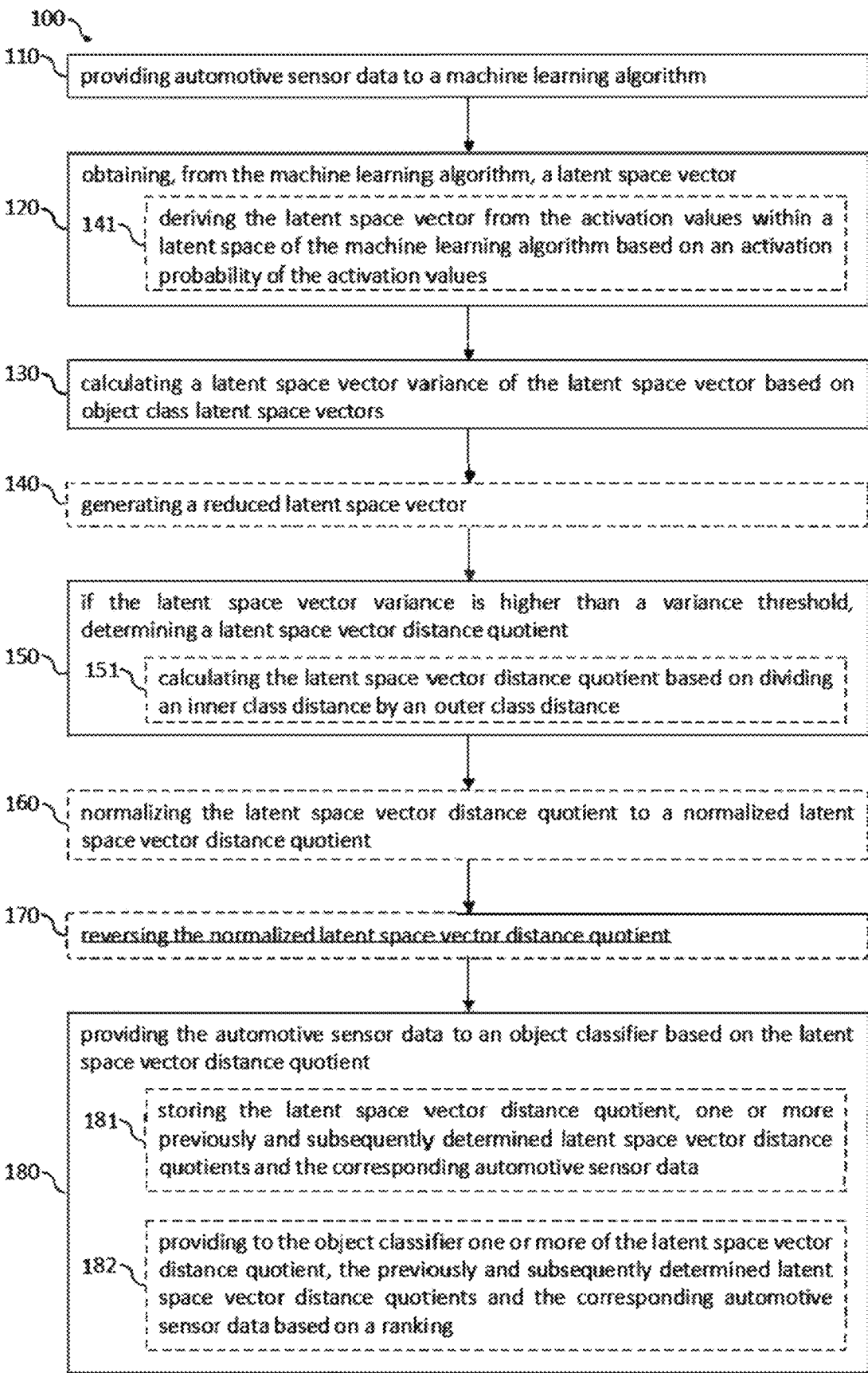

100

110 providing automotive sensor data to a machine learning algorithm 120 obtaining, from the machine learning algorithm, a latent space vector 141 deriving the latent space vector from the activation values within a latent space of the machine learning algorithm based on an activation probability of the activation values 130 calculating a latent space vector variance of the latent space vector based on object class latent space vectors 140 generating a reduced latent space vector 150 if the latent space vector variance is higher than a variance threshold, determining a latent space vector distance quotient 151 calculating the latent space vector distance quotient based on dividing an inner class distance by an outer class distance 160 normalizing the latent space vector distance quotient to a normalized latent space vector distance quotient 170 reversing the normalized latent space vector distance quotient 180 providing the automotive sensor data to an object classifier based on the latent space vector distance quotient 181 storing the latent space vector distance quotient, one or more previously and subsequently determined latent space vector distance quotients and the corresponding automotive sensor data 182 providing to the object classifier one or more of the latent space vector distance quotient, the previously and subsequently determined latent space vector distance quotients and the corresponding automotive sensor data based on a ranking

Fig. 1

ACTIVE LEARNING FOR OBJECT CLASSIFICATION IN VISUAL PERCEPTION TASKS IN A VEHICLE

CROSS REFERENCE TO RELATED APPLICATION

This application claims priority under 35 U.S.C. § 119 from German Patent Application No. DE 10 2023 133 826.9, filed Dec. 4, 2023, the entire disclosure of which is herein expressly incorporated by reference.

BACKGROUND AND SUMMARY OF THE INVENTION

The invention generally relates to active learning and more precisely to active learning in the context of perception tasks in vehicles configured to provide at least partial driving automation.

To enable at least partial driving automation, a vehicle needs to accurately perform automotive perception tasks, such as object classification, object detection or semantic segmentation. These perception tasks are usually performed by machine learning algorithms, which need to be trained on large datasets and may be further improved even once the vehicle is deployed in traffic. One way of ensuring accurate performance of automotive perception tasks by the machine learning algorithms is to train the machine learning algorithms with large, labeled datasets, i.e. datasets which indicate the outcome of the respective automotive perception task. However, since such labeling may be performed manually, large, labeled datasets to train machine learning algorithms for at least partial driving automation may be costly to generate. To overcome this issue, active learning may be used, i.e. a given machine learning algorithm may be inferenced on unlabeled data and may request that a subset of the unlabeled data be labeled based on active learning criteria. However, the active learning criteria need to generally be determined in a way which improves a given machine learning algorithm and in the context of at least partial driving automation need to enable achieving the level of accuracy of a machine learning algorithm required for of at least partial driving automation.

It is therefore an objective of the present disclosure to provide active learning criteria which enable the training and improvement of a machine learning algorithm configured to perform an automotive perception task in a manner ensuring the accuracy required for at least partial driving automation.

To achieve this objective, the present disclosure provides a method configured to enable active learning for object classification in visual perception tasks in a vehicle configured to provide at least partial driving automation. The method provides automotive sensor data to a machine learning algorithm. The machine learning algorithm has been trained based on training automotive sensor data to classify objects in an environment of the vehicle. The automotive sensor data serve as an input of the machine learning algorithm. An output of the machine learning algorithm corresponds to an object class determined by the machine learning algorithm based on the automotive sensor data. The method further obtains, from the machine learning algorithm, a latent space vector. The latent space vector corresponds to activation values within a latent space of the machine learning algorithm. The latent space includes all activation values of the machine learning algorithm without activation values corresponding to the input and the output. The method further calculates at least one latent space vector variance of the latent space vector based on object class latent space vectors. The object class latent space vectors correspond to previous automotive sensor data determined to correspond to the object class of the latent space vector. If the at least one latent space vector variance exceeds a variance threshold, the method determines a latent space vector distance quotient. The latent space vector distance quotient is indicative of a distance of the latent space vector to a closest object class latent space vector of the object class latent space vectors relative to a distance of the latent space vector to a closest latent space vector determined to correspond to an object class different from the object class of the latent space vector. Finally, the method provides the automotive sensor data to an object classifier based on the latent space vector distance quotient.

The present disclosure further provides an automotive control unit. The automotive control unit comprises at least one processing unit and a memory coupled to the at least one processing unit and configured to store machine-readable instructions. The machine-readable instructions cause the at least one processing unit to provide automotive sensor data to a machine learning algorithm. The machine learning algorithm has been trained based on training automotive sensor data to classify objects in an environment of the vehicle. The automotive sensor data serve as an input of the machine learning algorithm. An output of the machine learning algorithm corresponds to an object class determined by the machine learning algorithm based on the automotive sensor data. The machine-readable instructions further cause the at least one processing unit to obtain, from the machine learning algorithm, a latent space vector. The latent space vector corresponds to activation values within a latent space of the machine learning algorithm. The latent space includes all activation values of the machine learning algorithm without activation values corresponding to the input and the output. The machine-readable instructions further cause the at least one processing unit to calculate at least one latent space vector variance of the latent space vector based on object class latent space vectors. The object class latent space vectors correspond to previous automotive sensor data determined to correspond to the object class of the latent space vector. If the at least one latent space vector variance exceeds a variance threshold, the machine-readable instructions cause the at least one processing unit to determine a latent space vector distance quotient. The latent space vector distance quotient is indicative of a distance of the latent space vector to a closest object class latent space vector of the object class latent space vectors relative to a distance of the latent space vector to a closest latent space vector determined to correspond to an object class different from the object class of the latent space vector. Finally, the machine-readable instructions cause the at least one processing unit to provide the automotive sensor data to an object classifier based on the latent space vector distance quotient.

The present disclosure further provides a vehicle comprising the automotive control unit.

Examples of the present disclosure will be described with reference to the following appended drawings, in which like reference signs refer to like elements.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a flowchart of a method configured to enable active learning for object classification in visual perception tasks in a vehicle configured to provide at least partial driving automation according to examples of the present disclosure.

DETAILED DESCRIPTION OF THE DRAWINGS

Figure 2:
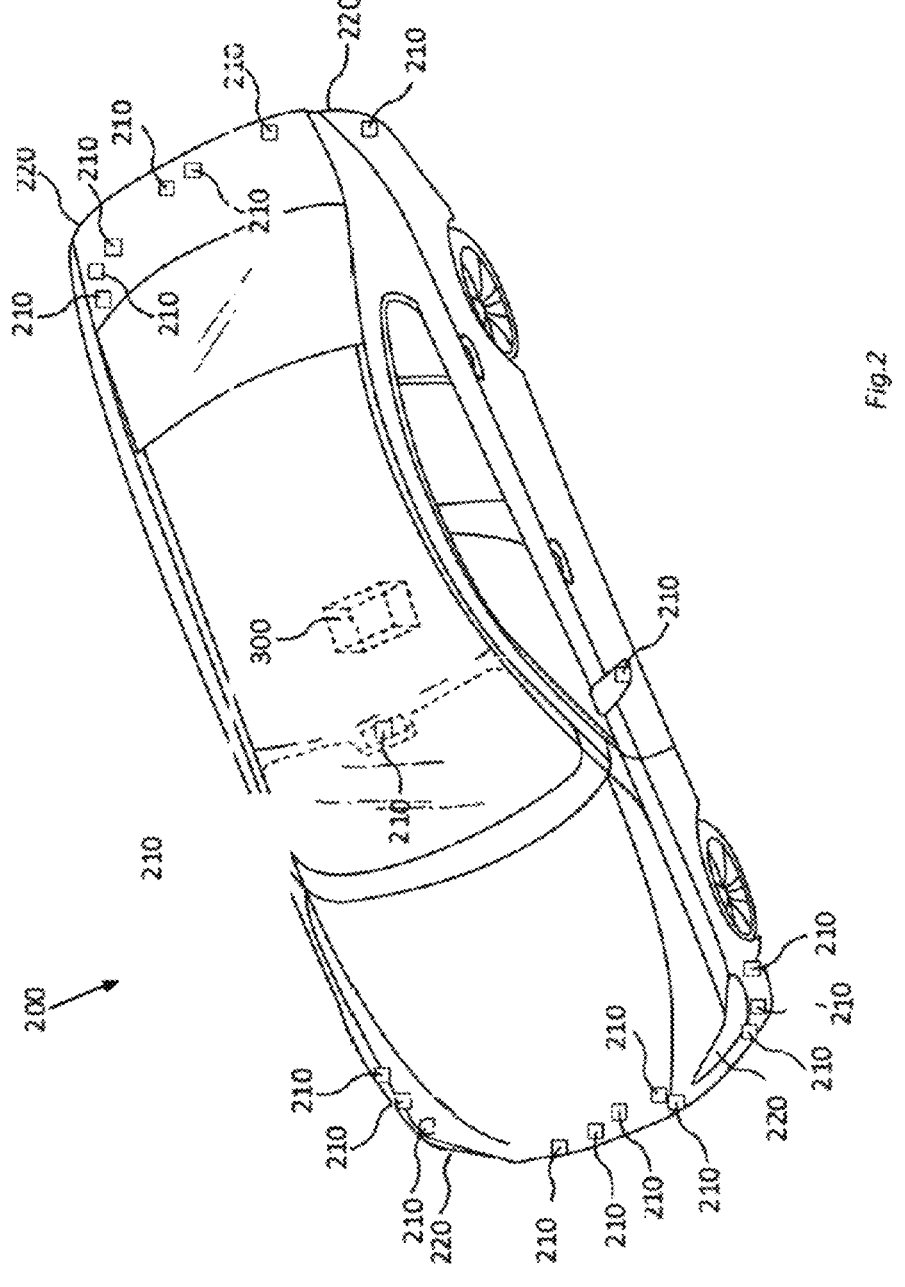
FIG. 2 illustrates a vehicle according to examples of the present disclosure.

It should be understood that the above-identified drawings are in no way meant to limit the present disclosure. Rather, these drawings are provided to assist in understanding the present disclosure. The person skilled in the art will readily understand that aspects of the present invention shown in one drawing may be combined with aspects in another drawing or may be omitted without departing from the scope of the present disclosure.

The present disclosure generally provides a method configured to enable active learning for object classification in visual perception tasks in a vehicle configured to provide at least partial driving automation. In addition, the present disclosure generally provides an automotive control unit configured to execute instructions implementing said method and a vehicle including said automotive control unit.

To enable active learning for object classification in visual perception tasks in a vehicle, a machine learning algorithm is initially trained with training automotive sensor data in order to determine object classes in automotive sensor data, i.e. data captured by various automotive sensors of the vehicle. During both the training of the machine learning algorithm, if the training data is fully or partially unlabeled, as well as during the subsequent deployment of the machine learning algorithm during operation of the vehicle on the road, the machine learning algorithm may perform data collection for active learning. More precisely, the machine learning algorithm performs the data collection for active learning using a two-step approach based on a latent space vector obtained from a latent space of the machine learning algorithm.

In the first step, at least one latent space vector variance of the latent space vector with regard to latent space vectors is determined to correspond to the same object class as the latent space vector is calculated. The at least one latent space vector variance may e.g. be a variance of the magnitude of the latent space vector or a variance of some or all components of the latent space vector. If the at least one latent space vector variance exceeds a variance threshold, the latent space vector is considered to be out-of-distribution (OOD).

If the at least one latent space vector variance exceeds the variance threshold, a latent space vector distance quotient is calculated in the second step. The latent space vector distance quotient indicates whether the latent space vector is closer to a latent space vector determined to correspond to another object class than to a latent space vector determined to correspond to the same object class as the latent space vector. Based on latent space vector distance quotient, the automotive sensor data corresponding to the latent space vector are provided to an object classifier, which labels the data and returns the automotive sensor data together with the label to the machine learning algorithm in order to improve the performance of the perception task by the machine learning algorithm.

By providing automotive sensor data to the object classifier based on the latent space vector distance quotient, automotive sensor data is chosen for active learning which corresponds to spares regions of the determined object class due to the distance from the closest latent space vector of the same object class as the latent space vector. Further, due to this approach automotive sensor data is chosen for active learning which corresponds to decision boundaries between object classes due to the closeness of the latent space vector to a latent space vector of a different object class.

In summary, performing active learning using the two-step approach enables selecting automotive sensor data for labeling by the object classifier which is OOD and which enables increasing coverage in sparse regions of the determined object class and which enables increasing coverage at decision boundaries, i.e. at boundaries between object classes.

This general concept will be explained with reference to the appended drawings, with FIG. 1 providing a flowchart of a method 100 configured to enable active learning for object classification in visual perception tasks in a vehicle configured to provide at least partial driving automation. In addition, FIG. 2 illustrates a vehicle according to the present disclosure and FIG. 3 illustrates an automotive controller configured to perform method 100.

It will be understood that dashed boxes in FIG. 1 illustrate optional steps of method 100.

Figure 3:
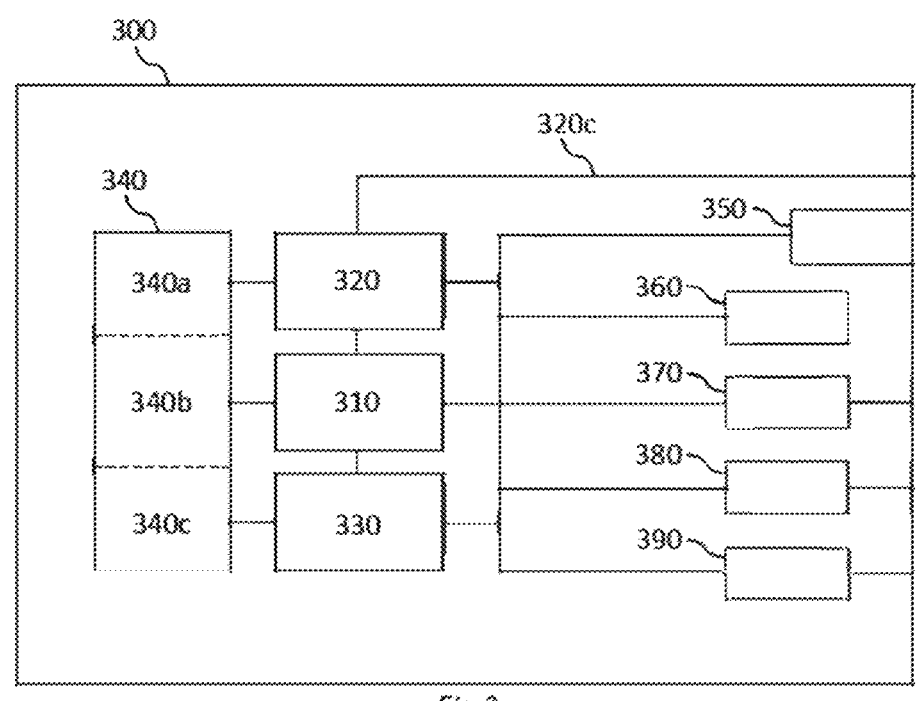
FIG. 3 illustrates an automotive control unit according to examples of the present disclosure.

Method 100 is configured to enable active learning for object classification in visual perception tasks in a vehicle, such as vehicle 200 of FIG. 2, configured to provide at least partial driving automation.

Vehicle 200 in the context of the present disclosure refers to any kind of motor vehicle configured to transport people and/or cargo. The motor of vehicle 200 may be any kind of motor, such as an electric motor or an internal combustion engine. Vehicle 200 may e.g. be a passenger vehicle. It will however be understood that the vehicle 200 may also be a bus, a truck or any other kind of vehicle including one or more sensors 210 and an automotive control unit 300 enabling vehicle 200 to provide at least partial driving automation. That is, automotive control unit 300 and one or more sensors 210 are configured to enable at least partial driving automation, i.e. level 2 as defined in standard J3016 of SAE International. Accordingly, method 100 enables accurate performance of object classification in visual perception tasks within automotive control unit 400 in order to enable safe control of the longitudinal and the lateral of vehicle 200. It will be understood that method 100, automotive control unit 300 and one or more sensors 210 may enable higher levels of automation, e.g. up to and including level 5 as defined in standard J3016 of SAE International.

The one or more sensors 210 may be configured to capture automotive sensor data indicative of the environment of vehicle 200, which may provide the environmental awareness enabling at least partial driving automation. For example, the one or more sensors 210 may provide vehicle 200 with information on the position and size of other vehicles or with information regarding road surface markings, which are extracted from the automotive sensor data based on the object classification performed by the machine learning algorithm. To this end, the one or more sensors 210 may be radar sensors, which may be configured to emit radio waves in order to determine a distance, an angle and a velocity of objects around the vehicle based on the reflected radio waves. The one or more sensors 210 may be light detection and ranging (LIDAR) sensors, which are configured to emit laser beams in order to determine a distance, an angle and a velocity of objects around vehicle 200 based on the reflected laser beams. The one or more sensors 210 may be cameras, which capture images of the environment of the vehicle. The one or more sensors 210 may be thermographic cameras, which capture images of the environment of vehicle 200 based on infrared radiation. It will be understood that LIDAR sensors, radar sensors or cameras are merely provided as examples of sensor types of the one or more sensors 210. For example, the one or more sensors 210 may also be ultrasonic sensors. More generally, the one or more sensors 210 may be any type of sensor capable of capturing sensor data indicative of the environment of vehicle 200. It will further be understood that the one or more sensors 210 may include multiple sensors of various types of sensors. Further, the one or more sensors 210 of the same type may exhibit different properties, e.g. by being configured to capture sensor data at different ranges, such as a close range, a middle range and a far range. For example, vehicle 200 may include three close range radar sensors each at a front and a back of vehicle 200, a middle range to far range radar sensor at the back of vehicle 200, a LIDAR sensor at the front of vehicle 200, a rear-facing camera at the back of vehicle 200, a front-facing camera at the front of the vehicle, a front-facing camera at the rear-view mirror and a rear-facing close range to middle range radar sensor in each door-mounted outer rear view mirror. It will be understood that vehicle 200 may include more or fewer automotive sensors than shown in FIG. 2 and discussed in the above example.

Automotive control unit 300 will be discussed in more detail below with regard to FIG. 3.

In the context of the present disclosure, visual perception task refers to any kind of task identifying one or more object classes within the automotive sensor data captured by the one or more sensors 210. The visual perception task may for example identify within automotive sensor data provided by a camera included in vehicle 200 whether vehicle 200 is located on a controlled-access highway, a limited-access road, an arterial road, a local road or a parking lot. In this case, the one or more object classes correspond to the type of road on which vehicle 200 may be located. Further, the visual perception task may for example identify within automotive sensor data provided by a LIDAR sensor and multiple cameras included in vehicle 200 other vehicles and the type of vehicle, road surface markings and the type of road surface marking, road signs and the type of road sign, vulnerable road users (VRUs) as well as traffic lights and the indication state of the traffic light. Accordingly, the one or more object classes may correspond to any possible road user, road traffic control device and road surface marking as well as any other type of possible element in the vicinity of vehicle 200 relevant for providing at least partial driving automation. More generally, the visual perception task may thus be any perception task determining the class of objects in the vicinity of vehicle 200, with the objects referring to both a determination of the general environment of vehicle 200 as well as a determination of individual elements in the vicinity of vehicle 200.

In the context of the visual perception task, active learning is thus to be understood in the context of the present disclosure to refer to a machine learning algorithm performing the visual perception task requesting an object classifier to label the automotive sensor data, i.e. to determine an object class within the automotive sensor data.

The machine learning algorithm may be any kind of machine learning algorithm which has been trained based on training automotive sensor data to classify objects in an environment of the vehicle, i.e. which has been trained to perform a visual perception task as defined above. Training automotive sensor data may be unlabeled, partially labeled or fully labeled. In other words, the training automotive sensor data may include the corresponding object classes in addition to the automotive sensor data. However, given the active learning functionality discussed above and described in detail below, the training automotive sensor data need not be fully labeled. The machine learning algorithm may be a feature extractor configured to extract objects from the automotive sensor data and to determine the object class of the extracted objects. To this end, the machine learning algorithm may e.g. be an artificial neural network (ANN) or an autoencoder.

In step 110, method 100 provides automotive sensor data to the machine learning algorithm. That is, the automotive sensor data serve as an input of the machine learning algorithm while an output of the machine learning algorithm corresponds to an object class determined by the machine learning algorithm based on the automotive sensor data.

In step 120, method 100 obtains a latent space vector from the machine learning algorithm. The latent space vector corresponds to activation values within a latent space of the machine learning algorithm. The latent space includes all activation values of the machine learning algorithm without activation values corresponding to the input and the output. Using an ANN as an example of the machine learning algorithm, the latent space may for example include the activation values of all neurons of all layers excluding the input layer and the output layer. In this example, the latent space vector may thus include all activation values of an intermediate layer of the ANN. The intermediate layer may for example be the layer of the ANN preceding the output layer. Using an autoencoder as a further example of the machine learning algorithm, the latent space may again include all activation values of all neurons between the input layer and the output layer with the latent space vector corresponding to a code, i.e. the bottleneck, of the autoencoder.

Since the latent space vector corresponds to activation values within the latent space of the machine learning algorithm, it will be understood that the components of the latent space vector may directly be a subset of the activation values within the latent space, e.g. the activation values of all neurons of a layer of an ANN, or may be values obtained based on processing of a subset of the activation values within the latent space. For example, the components of the latent space vector may reflect a probability of an activation of a given neuron, which may be derived from the corresponding activation values and the deviation of the corresponding output and the correspondingly determined object class of the machine learning algorithm from a normal distribution of the determined object class. The lower the probability that a given neuron is activated, the higher the probability that an activation of the given neuron leads to a determination of an object class of the corresponding automotive sensor data which may be OOD. Accordingly, in some examples of the present disclosure, the components of latent space vectors may correspond to pre-processed activation values of the latent space of the machine learning algorithm in order to improve the OOD detection of the automotive sensor data and thereby the selection of the automotive sensor data for active learning.

To this end, step 120 may include a step 121, in which method 100 derives the latent space vector from the activation values within the latent space of the machine learning algorithm based on an activation probability of the activation values.

In step 130, method 100 calculates at least one latent space vector variance of the latent space vector based on object class latent space vectors. The object class latent space vectors correspond to previous automotive sensor data determined to correspond to the object class of the latent space vector. In other words, method 100 may determine, as part of step 130, latent space vectors whose corresponding automotive sensor data were previously classified as belonging to the same object class as the latent space vector during execution of the visual perception task by the machine learning algorithm. The object class latent space vectors may be a set of latent space vectors determined for each object class during training of the machine learning algorithm or may be continuously updated based on further object classification performed with automotive data constantly processed by the machine learning algorithm during operation of vehicle 200. As part of step 130, method 100 may calculate on latent space vector variance based on the magnitude of the latent space vector with regard to the magnitude of the object class latent space vectors. Method 100 may also, as part of step 130, calculate the variance of some or all components of the latent space vector with regard to the corresponding some or all components of the object latent space vectors. The calculation of the at least latent space vector variance enables determining whether the latent space vector is OOD. That is, step 130 corresponds to the first step of the two-step approach for active learning selection discussed above. In examples of the present disclosure, in which the latent space vector includes components derived from the activation values based on the activation probability, as discussed above, step 130 and the accordingly derived components of the latent space vector together correspond the first step of the two-step approach for active learning selection discussed above.

Method 100 may include a step 140, in which method 100 generates a reduced latent space vector, which includes the components of the latent space vector exceeding a variance threshold. The variance threshold may be any value indicative of a given latent space vector variance being OOD for a given object class. In other words, in addition to using the at least one latent space vector variance for OOD detection, the at least one latent space vector variance may further be used to reduce the dimensionality of the latent space vector to dimensions determined to be OOD, thereby reducing the computational effort of the subsequent steps of method 100.

In step 150, method 100 determines, the latent space vector distance quotient discussed above. The latent space vector distance quotient is indicative of a distance of the latent space vector to a closest object class latent space vector of the object class latent space vectors relative to a distance of the latent space vector to a closest latent space vector determined to correspond to an object class different from the object class of the latent space vector. In other words, method 100 determines in step 150 the shortest, i.e. closest, distance of the latent space vector to an object class latent space vector, i.e. a latent space vector whose corresponding automotive sensor data were previously classified as belonging to the same object class as the latent space vector during execution of the visual perception task by the machine learning algorithm. As will be apparent, the object class latent space vector accordingly is one of the object class latent space vectors used to calculate the at least one latent space vector variance in step 130. Likewise, method 100 determines in step 150 the shortest, i.e. closest, distance of the latent space vector to a latent space vector whose corresponding automotive sensor data were previously classified as belonging to a different object class than the latent space vector during execution of the visual perception task by the machine learning algorithm. Both distances may e.g.

be the Euclidian distance between the latent space vector and the closest object class latent space vector. Step 150 accordingly implements the second step of the two-step active learning approach and thereby ensures that automotive sensor data is chosen for active learning which corresponds to both spare regions of the determined object class due to the distance from the closest object class latent space vector and to decision boundaries between different object classes due to the closeness of the latent space vector to a latent space vector of a different object class.

To determine the latent space vector quotient, method 100 may include a step 151, in which method 100 may calculate the latent space vector distance quotient based on dividing an inner class distance by an outer class distance. The inner class distance may correspond to a distance between the latent space vector and an object class latent space vector of the object class latent space vectors closest to the latent space vector. The outer class distance may correspond to a distance between the latent space vector and a different object class latent space vector closest to the latent space vector. The different object class latent space vector may correspond to an object class different from the object class corresponding to the latent space vector.

In examples of the present disclosure in which method 100 generates the reduced latent space vector, method 100 may determine the latent space vector distance quotient based on the reduced latent space vector. That is, in examples in which method 100 generates the reduced latent space vector, the latent space vector distance quotient is indicative of a distance of the reduced latent space vector to a closest reduced object class latent space vector of the object class latent space vectors relative to a distance of the reduced latent space vector to a closest reduced latent space vector determined to correspond to an object class different from the object class of the latent space vector. In other words, the determination of the latent space vector distance quotient may only be based on the dimensions of the reduced latent space vector, which may reduce the computational effort of the determination of the latent space vector distance quotient.

Method 100 may include a step 160, in which method 100 normalizes the latent space vector distance quotient to a normalized latent space vector distance quotient which has a value within a distance quotient range. Further method 100 may include a step 170, in which method 100 reverses the normalized latent space vector distance quotient. Normalizing the latent space vector quotient and reversing the normalized latent space vector distance quotient may improve the comparability and further processing of the latent space vector distance quotient. Normalizing the latent space vector distance quotient to the normalized latent space vector distance quotient may be based on one of a sigmoid function, a hyperbolic tangent function, a Soboleva modified hyperbolic tangent function or a Gaussian function.

In step 180, method 100 provides the automotive sensor data to an object classifier based on the latent space vector distance quotient. That is, the automotive sensor data may be chosen for active learning, i.e. may be chosen labeling, if the latent space vector distance quotient indicates that the classification of the automotive sensor data appears to be OOD and corresponds to areas with low coverage and/or decision boundaries. The object classifier may be one of a user of vehicle 200 and a cloud-based object classification service. More generally, the object classifier may be any entity capable of labeling the autonomous data if requested to dos so and may also be referred to as an oracle or an annotator. In other words, if the automotive sensor data is chosen for active learning, the automotive sensor data may e.g. be displayed to the user of vehicle 200 to obtain a classification of the automotive sensor data from the user. For example. The automotive sensor data may be displayed to the user of vehicle 200 on a screen integrated into the dashboard of vehicle 200 alongside with a request to for example confirm that a traffic control device visible in the automotive sensor data is indeed a stop sign or in the alternative to indicate what is visible in the automotive sensor data. If the object classifier is a cloud-based object classification service, such as a classification service of the manufacturer of vehicle 200, the automotive sensor data may be wirelessly transmitted to the cloud-based object classification service, which may classify the one or more objects visible in the automotive sensor data and may provide the labeled automotive sensor data to not only vehicle 200 but to all vehicles of the manufacturer in order to improve the performance of the visual perception task by the machine algorithm on all vehicles of the manufacturer.

Providing the automotive sensor data to the object classifier may be based on a latent space vector distance quotient threshold. That is, the automotive sensor data may be provided to the object classifier if the latent space vector distance quotient exceeds a value indicative of a necessity that the automotive data be labeled due to the latent space vector distance quotient indicating that the automotive sensor data may be OOD and may increase the coverage in spare regions of an object class or at decision boundaries. Providing the automotive sensor data to the object classifier may also be based on selecting one or more sets of automotive sensor data with corresponding latent space vector distance quotients indicating that the one or more sets of automotive sensor data may be more OOD and may increase the coverage in spare regions of an object class or at decision boundaries more than other sets of automotive sensor data. To this end, method 100 may include steps 181 and 182. In step 181, method 100 may store the latent space vector distance quotient and the corresponding automotive sensor data as well as one or more previously determined latent space vector distance quotients and the corresponding automotive sensor data and one or more subsequently determined latent space vector distance quotients and the corresponding automotive sensor data. In step 181, method 100 may provide to the object classifier one or more of the latent space vector distance quotient, the one or more previously determined latent space vector distance quotients and the one or more subsequently determined latent space vector distance quotients and the corresponding automotive sensor data based on a ranking of the corresponding latent space vector distance quotients.

FIG. 3 shows automotive control unit 300 configured to perform method 100. automotive control unit 300 may include a processor 310, a graphics processing unit (GPU) 320, automotive processing system 330, a memory 340, a removable storage 350, a storage 360, a cellular interface 370, a global navigation satellite system (GNSS) interface 380 and a communication interface 390.

Processor 310 may be any kind of single-core or multi-core processing unit employing a reduced instruction set (RISC) or a complex instruction set (CISC). Exemplary RISC processing units include ARM based cores or RISC V based cores. Exemplary CISC processing units include x86 based cores or x86-64 based cores. Processor 310 may perform instructions causing automotive control unit 300 to perform method 100. Processor 310 may be directly coupled to any of the components of computing device 300 or may be directly coupled to memory 330, GPU 320 and a device bus.

GPU 320 may be any kind of processing unit optimized for processing graphics related instructions or more generally for parallel processing of instructions. As such, GPU 320 may be configured to generate a display of information, such as ADAS information or telemetry data, to a driver of the vehicle, e.g. via a head-up display (HUD) or a display arranged within the view of the driver. GPU 320 may be coupled to the HUD and/or the display via connection 320C. GPU 320 may further perform at least a part of method 100 to enable fast parallel processing of instructions relating to method 300. It should be noted that in some embodiments, processor 310 may determine that GPU 320 need not perform instructions relating to method 300. GPU 320 may be directly coupled to any of the components of automotive control unit 300 or may be directly coupled to processor 310 and memory 330. In some embodiments, GPU 320 may also be coupled to the device bus.

Automotive processing system 330 may be any kind of system-on chip configured to provide trillions of operations per second (TOPS) in order to enable automotive control unit 300 to implement one or more ADAS while driving. Automotive processing system 330 may only interface with processor 310 or may interface with other devices via the system bus. Automotive processing system 330 may for example execute the machine learning algorithm performing the visual perception task.

Memory 340 may be any kind of fast storage enabling processor 310, GPU 320 and automotive processing system 430 to store instructions for fast retrieval during processing of instructions as well as to cache and buffer data. Memory 340 may be a unified memory coupled to processor 310 and GPU 320 and automotive processing system 330 in order to enable allocation of memory 340 to processor 310, GPU 320 and automotive processing system 330 as needed. Alternatively, processor 310, GPU 320 and automotive processing system 330 may be coupled to separate processor memory 340$a$, GPU memory 340$b$ and automotive processing system memory 340$c$.

Removable storage 350 may be a storage device which can be removably coupled with automotive control unit 400. Examples include a digital versatile disc (DVD), a compact disc (CD), a Universal Serial Bus (USB) storage device, such as an external SSD, or a magnetic tape. It should be noted that removable storage 350 may store data, such as instructions of method 200 and/or automotive sensor data, or may be omitted.

Storage 360 may be a storage device enabling storage of program instructions and other data. For example, storage 360 may be a hard disk drive (HDD), a solid state disk (SSD) or some other type of non-volatile memory. Storage 360 may for example store the instructions of method 100.

Removable Storage 350 and storage 360 may be coupled to processor 310 via the system bus. The system bus may be any kind of bus system enabling processor 310 and optionally GPU 320 as well as automotive processing system 330 to communicate with the other devices of automotive control unit 300. The system bus may for example be a Peripheral Component Interconnect express (PCIe) bus or a Serial AT Attachment (SATA) bus.

Cellular interface 370 may be any kind of interface enabling automotive control unit 300 to communicate via a cellular network, such as a 4G network or a 5G network.

GNSS interface 380 may be any kind of interface enabling automotive control unit 300 to receive position data provided by a satellite network, such as the Global Positioning System (GPS), the Global Navigation Satellite System (GLONASS) or Galileo. The position data may be used when generating and updating egress route graph 320 and when determining and re-determining the egress route.

Communications interface 390 may enable computing device 300 to interface with external devices, either directly or via network, via connection 380C. Communications interface 380 may for example enable computing device 300 to couple to a wired or wireless network, such as Ethernet, Wifi, a Controller Area Network (CAN) bus or any bus system appropriate in vehicles. For example, automotive control unit 300 may be coupled to the one or more sensors 210 to receive information about the environment of vehicle 200 in order to classify objects in the vicinity of vehicle 200. Communications interface 390 may also include a USB port or a serial port to enable direct communication with an external device.

Automotive control unit 300 may be integrated with the vehicle, e.g. beneath the cabin, under the dashboard or in the trunk of vehicle 300.

The invention may further be illustrated by the following examples.

In an example, a method is configured to enable active learning for object classification in visual perception tasks in a vehicle configured to provide at least partial driving automation. The example method provides automotive sensor data to a machine learning algorithm. The machine learning algorithm has been trained based on training automotive sensor data to classify objects in an environment of the vehicle. The automotive sensor data serve as an input of the machine learning algorithm. An output of the machine learning algorithm corresponds to an object class determined by the machine learning algorithm based on the automotive sensor data. The example method further obtains, from the machine learning algorithm, a latent space vector. The latent space vector corresponds to activation values within a latent space of the machine learning algorithm. The latent space includes all activation values of the machine learning algorithm without activation values corresponding to the input and the output. The example method further calculates at least one latent space vector variance of the latent space vector based on object class latent space vectors. The object class latent space vectors correspond to previous automotive sensor data determined to correspond to the object class of the latent space vector. If the at least one latent space vector variance exceeds a variance threshold, the example method determines a latent space vector distance quotient. The latent space vector distance quotient is indicative of a distance of the latent space vector to a closest object class latent space vector of the object class latent space vectors relative to a distance of the latent space vector to a closest latent space vector determined to correspond to an object class different from the object class of the latent space vector. Finally, the example method provides the automotive sensor data to an object classifier based on the latent space vector distance quotient.

In the example method, determining the latent space vector distance quotient may comprise calculating the latent space vector distance quotient based on dividing an inner class distance by an outer class distance, wherein the inner class distance may correspond to a distance between the latent space vector and an object class latent space vector of the object class latent space vectors closest to the latent space vector and wherein the outer class distance may correspond to a distance between the latent space vector and a different object class latent space vector closest to the latent space vector, the different object class latent space vector corresponding to an object class different from the object class corresponding to the latent space vector.

The example method may further comprise if at least one of the latent space vector variances exceeds a variance threshold, generating a reduced latent space vector, the reduced latent space vector including the components of the latent space vector exceeding the variance threshold, wherein the determining the latent space vector distance quotient may be indicative of a distance of the reduced latent space vector to a closest reduced object class latent space vector of the object class latent space vectors relative to a distance of the reduced latent space vector to a closest reduced latent space vector determined to correspond to an object class different from the object class of the latent space vector.

In the example method, the obtaining the latent space vector may include deriving the latent space vector from the activation values within the latent space of the machine learning algorithm based on an activation probability of the activation values.

The example method may further comprise normalizing the latent space vector distance quotient to a normalized latent space vector distance quotient having a value within a distance quotient range and reversing the normalized latent space vector distance quotient.

In the example method, the normalizing the latent space vector distance quotient to the normalized latent space vector distance quotient may be based on one of a sigmoid function, a hyperbolic tangent function, a Soboleva modified hyperbolic tangent function or a Gaussian function.

In the example method, the machine learning algorithm may be an artificial neural network, and the latent space vector may include all activation values of an intermediate layer of the artificial neural network between an input layer and an output layer of the artificial neural network.

In the example method, the intermediate layer may be the layer of the artificial neural network preceding the output layer.

In the example method, the machine learning algorithm may be an autoencoder, and the latent space vector may correspond to a code of the autoencoder.

In the example method, the providing the automotive sensor data to the object may be based on a latent space vector distance quotient threshold.

In the example method, the providing the automotive sensor data to the object classifier may include storing the latent space vector distance quotient and the corresponding automotive sensor data as well as one or more previously determined latent space vector distance quotients and the corresponding automotive sensor data and one or more subsequently determined latent space vector distance quotients and the corresponding automotive sensor data and providing to the object classifier one or more of the latent space vector distance quotient, the one or more previously determined latent space vector distance quotients and the one or more subsequently determined latent space vector distance quotients and the corresponding automotive sensor data based on a ranking of the corresponding latent space vector distance quotients.

In the example method, the object classifier may be one of a user of the vehicle and a cloud-based object classification service.

In an example, an automotive control unit, comprises at least one processing unit and a memory coupled to the at least one processing unit and configured to store machine-readable instructions. The machine-readable instructions cause the at least one processing unit to provide automotive sensor data to a machine learning algorithm. The machine learning algorithm has been trained based on training automotive sensor data to classify objects in an environment of the vehicle. The automotive sensor data serve as an input of the machine learning algorithm. An output of the machine learning algorithm corresponds to an object class determined by the machine learning algorithm based on the automotive sensor data. The machine-readable instructions further cause the at least one processing unit to obtain, from the machine learning algorithm, a latent space vector. The latent space vector corresponds to activation values within a latent space of the machine learning algorithm. The latent space includes all activation values of the machine learning algorithm without activation values corresponding to the input and the output. The machine-readable instructions further cause the at least one processing unit to calculate at least one latent space vector variance of the latent space vector based on object class latent space vectors. The object class latent space vectors correspond to previous automotive sensor data determined to correspond to the object class of the latent space vector. If the at least one latent space vector variance exceeds a variance threshold, the machine-readable instructions cause the at least one processing unit to determine a latent space vector distance quotient. The latent space vector distance quotient is indicative of a distance of the latent space vector to a closest object class latent space vector of the object class latent space vectors relative to a distance of the latent space vector to a closest latent space vector determined to correspond to an object class different from the object class of the latent space vector. Finally, the machine-readable instructions cause the at least one processing unit to provide the automotive sensor data to an object classifier based on the latent space vector distance quotient.

In the example automotive control unit, the machine-readable instructions may further cause the at least one processing unit to perform the method of any one of the above example methods.

In an example, a vehicle comprises the automotive control unit of any one of the above example automotive control units.

The preceding description has been provided to illustrate enabling active learning for object classification in visual perception tasks in a vehicle. It should be understood that the description is in no way meant to limit the scope of the present disclosure to the precise embodiments discussed throughout the description. Rather, the person skilled in the art will be aware that the examples of the present disclosure may be combined, modified or condensed without departing from the scope of the present disclosure as defined by the following claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS 100 method
110-182 method steps
200 vehicle
210 automotive sensor
220 light 300 automotive control unit
310 CPU
320 GPU
320c connection
330 automotive processing system
340 memory
350 removable storage
360 storage
370 cellular interface
380 GNSS interface
390 communications interface

What is claimed is:

1. A method configured to enable active learning for object classification in visual perception tasks in a vehicle configured to provide at least partial driving automation, comprising:

providing automotive sensor data to a machine learning algorithm, the machine learning algorithm having been trained based on training previous automotive sensor data to classify objects in an environment of the vehicle, wherein the automotive sensor data serve as an input of the machine learning algorithm and wherein an output of the machine learning algorithm corresponds to an object class determined by the machine learning algorithm based on the automotive sensor data;

obtaining, from the machine learning algorithm, a latent space vector, the latent space vector corresponding to activation values within a latent space of the machine learning algorithm, the latent space including all activation values of the machine learning algorithm without activation values corresponding to the input and the output;

calculating at least one latent space vector variance of the latent space vector based on object class latent space vectors, the object class latent space vectors corresponding to the previous automotive sensor data determined to correspond to the object class determined by the machine learning algorithm;

when the at least one latent space vector variance exceeds a variance threshold, determining a latent space vector distance quotient indicative of a distance of the latent space vector to a closest object class latent space vector of the object class latent space vectors relative to a distance of the latent space vector to a closest latent space vector determined to correspond to an object class different from the object class of the latent space vector;

providing the automotive sensor data to an object classifier based on the latent space vector distance quotient;

normalizing the latent space vector distance quotient to a normalized latent space vector distance quotient having a value within a distance quotient range; and reversing the normalized latent space vector distance quotient.

2. The method of claim 1, wherein the determining the latent space vector distance quotient comprises:

calculating the latent space vector distance quotient based on dividing an inner class distance by an outer class distance, wherein the inner class distance corresponds to a distance between the latent space vector and an object class latent space vector of the object class latent space vectors closest to the latent space vector, and wherein the outer class distance corresponds to a distance between the latent space vector and a different object class latent space vector closest to the latent space vector, the different object class latent space vector corresponding to an object class different from the object class corresponding to the latent space vector.

3. The method of claim 1, further comprising:

when at least one of the latent space vector variances exceeds a variance threshold, generating a reduced latent space vector, the reduced latent space vector including components of the latent space vector exceeding the variance threshold, wherein the determining the latent space vector distance quotient is indicative of a distance of the reduced latent space vector to a closest reduced object class latent space vector of the object class latent space vectors relative to a distance of the reduced latent space vector to a closest reduced latent space vector determined to correspond to an object class different from the object class of the latent space vector.

4. The method of claim 1, wherein the obtaining the latent space vector includes deriving the latent space vector from the activation values within the latent space of the machine learning algorithm based on an activation probability of the activation values.

5. The method of claim 1, wherein the normalizing the latent space vector distance quotient to the normalized latent space vector distance quotient is based on one of a sigmoid function, a hyperbolic tangent function, a Soboleva modified hyperbolic tangent function or a Gaussian function.

6. The method of claim 1, wherein:

the machine learning algorithm is an artificial neural network, and the latent space vector includes all activation values of an intermediate layer of the artificial neural network between an input layer and an output layer of the artificial neural network.

7. The method of claim 5, wherein the intermediate layer is the layer of the artificial neural network preceding the output layer.

8. The method of claim 1, wherein:

the machine learning algorithm is an autoencoder, and the latent space vector corresponds to a code of the autoencoder.

9. The method of claim 1, wherein the providing the automotive sensor data to the object classifier is based on a latent space vector distance quotient threshold.

10. The method of claim 1, wherein the providing the automotive sensor data to the object classifier includes:

storing the latent space vector distance quotient and the corresponding automotive sensor data as well as one or more previously determined latent space vector distance quotients and the corresponding automotive sensor data and one or more subsequently determined latent space vector distance quotients and the corresponding automotive sensor data; and providing to the object classifier one or more of the latent space vector distance quotient, the one or more previously determined latent space vector distance quotients and the one or more subsequently determined latent space vector distance quotients and the corresponding automotive sensor data based on a ranking of the corresponding latent space vector distance quotients.

11. The method of claim 1, wherein the object classifier is one of a user of the vehicle and a cloud-based object classification service.

12. An automotive control unit, comprising:

at least one processing unit; and a memory coupled to the at least one processing unit and configured to store machine-readable instructions, wherein the machine-readable instructions cause the at least one processing unit to:

provide automotive sensor data to a machine learning algorithm, the machine learning algorithm having been trained based on training previous automotive sensor data to classify objects in an environment of the vehicle, wherein the automotive sensor data serve as an input of the machine learning algorithm and wherein an output of the machine learning algorithm corresponds to an object class determined by the machine learning algorithm based on the automotive sensor data;

obtain, from the machine learning algorithm, a latent space vector, the latent space vector corresponding to activation values within a latent space of the machine learning algorithm, the latent space including all activation values of the machine learning algorithm without activation values corresponding to the input and the output;

calculate at least one latent space vector variance of the latent space vector based on object class latent space vectors, the object class latent space vectors corresponding to the previous automotive sensor data determined to correspond to the object class determined by the machine learning algorithm;

when the at least one latent space vector variance exceeds a variance threshold, determine a latent space vector distance quotient indicative of a distance of the latent space vector to a closest object class latent space vector of the object class latent space vectors relative to a distance of the latent space vector to a closest latent space vector determined to correspond to an object class different from the object class of the latent space vector;

provide the automotive sensor data to an object classifier based on the latent space vector distance quotient; and when at least one of the latent space vector variances exceeds a variance threshold, generate a reduced latent space vector, the reduced latent space vector including components of the latent space vector exceeding the variance threshold, wherein the determining the latent space vector distance quotient is indicative of a distance of the reduced latent space vector to a closest reduced object class latent space vector of the object class latent space vectors relative to a distance of the reduced latent space vector to a closest reduced latent space vector determined to correspond to an object class different from the object class of the latent space vector.

13. The automotive control unit of claim 12, wherein the machine-readable instructions further cause the at least one processing unit to:

calculate the latent space vector distance quotient based on dividing an inner class distance by an outer class distance, wherein the inner class distance corresponds to a distance between the latent space vector and an object class latent space vector of the object class latent space vectors closest to the latent space vector, and wherein the outer class distance corresponds to a distance between the latent space vector and a different object class latent space vector closest to the latent space vector, the different object class latent space vector corresponding to an object class different from the object class corresponding to the latent space vector.

14. The automotive control unit of claim 12, wherein the obtaining the latent space vector includes deriving the latent space vector from the activation values within the latent space of the machine learning algorithm based on an activation probability of the activation values.

15. The automotive control unit of claim 12, wherein the machine-readable instructions further cause the at least one processing unit to:

normalize the latent space vector distance quotient to a normalized latent space vector distance quotient having a value within a distance quotient range; and reverse the normalized latent space vector distance quotient.

16. The automotive control unit of claim 12, wherein the machine-readable instructions further cause the at least one processing unit to:

store the latent space vector distance quotient and the corresponding automotive sensor data as well as one or more previously determined latent space vector distance quotients and the corresponding automotive sensor data and one or more subsequently determined latent space vector distance quotients and the corresponding automotive sensor data; and provide to the object classifier one or more of the latent space vector distance quotient, the one or more previously determined latent space vector distance quotients and the one or more subsequently determined latent space vector distance quotients and the corresponding automotive sensor data based on a ranking of the corresponding latent space vector distance quotients.

17. A vehicle comprising the automotive control unit of claim 12.

18. A method configured to enable active learning for object classification in visual perception tasks in a vehicle configured to provide at least partial driving automation, comprising:

providing automotive sensor data to a machine learning algorithm, the machine learning algorithm having been trained based on training previous automotive sensor data to classify objects in an environment of the vehicle, wherein the automotive sensor data serve as an input of the machine learning algorithm and wherein an output of the machine learning algorithm corresponds to an object class determined by the machine learning algorithm based on the automotive sensor data;

obtaining, from the machine learning algorithm, a latent space vector, the latent space vector corresponding to activation values within a latent space of the machine learning algorithm, the latent space including all activation values of the machine learning algorithm without activation values corresponding to the input and the output;

calculating at least one latent space vector variance of the latent space vector based on object class latent space vectors, the object class latent space vectors corresponding to the previous automotive sensor data determined to correspond to the object class determined by the machine learning algorithm;

when the at least one latent space vector variance exceeds a variance threshold, determining a latent space vector distance quotient indicative of a distance of the latent space vector to a closest object class latent space vector of the object class latent space vectors relative to a distance of the latent space vector to a closest latent space vector determined to correspond to an object class different from the object class of the latent space vector; and providing the automotive sensor data to an object classifier based on the latent space vector distance quotient, wherein the providing the automotive sensor data to the object classifier includes:

storing the latent space vector distance quotient and the corresponding automotive sensor data as well as one or more previously determined latent space vector distance quotients and the corresponding automotive sensor data and one or more subsequently determined latent space vector distance quotients and the corresponding automotive sensor data; and providing to the object classifier one or more of the latent space vector distance quotient, the one or more previously determined latent space vector distance quotients and the one or more subsequently determined latent space vector distance quotients and the corresponding automotive sensor data based on a ranking of the corresponding latent space vector distance quotients.

* * * * *